United States Patent

[11] 3,626,183

[72] Inventors Peter Francis Berry;
James D. Hall; Tomihiko Furuta, all of Austin, Tex.
[21] Appl. No. 54,951
[22] Filed July 15, 1970
[45] Patented Dec. 7, 1971
[73] Assignee The United States of America as represented by the United States Atomic Energy Commission

[54] RADIOISOTOPE ANALYTICAL INSTRUMENT FOR CEMENT ANALYSIS OF CONCRETE
10 Claims, 4 Drawing Figs.
[52] U.S. Cl. .................................................. 250/43.5 D,
250/71.5 R, 250/83.3 D, 250/83.6 W
[51] Int. Cl. ................................................... G01t 1/20,
G01n 23/10
[50] Field of Search ........................................ 250/43.5 D,
83.3 D, 83.6 W, 83.6 S, 71.5 R, 106 R, 44

[56] References Cited
UNITED STATES PATENTS
3,529,151 9/1970 Carr-Brion .................. 250/43.5 D
3,452,201 6/1969 Hall, Jr. ....................... 250/83.6 W
FOREIGN PATENTS
41/41,200 10/1966 Japan ......................... 250/83.6 S

*Primary Examiner*—James W. Lawrence
*Assistant Examiner*—Morton J. Frome
*Attorney*—Roland A. Anderson

ABSTRACT: A portable radioisotope instrument has been developed for field cement analysis yielding an accuracy of 1 to 2 percent cement in wet concrete. The instrument consists essentially of a cylindrical depth probe unit in which a pair of $\gamma$-ray sources of different energy and a detector are arranged in coaxial alignment and the output of the detector is coupled to a portable scaler. The detector is shielded from the source so that only the $\gamma$-backscattered radiation is detected and through proper calibration of the device as to the aggregate type the operator can radially analyze a wet mix by inserting the probe into the mix and measure the two radiation intensities with reference to the proper calibration curve to determine the cement content.

INVENTORS.
Peter F. Berry
James D. Hall
Tomihiko Furuta
ATTORNEY.

INVENTORS.
Peter F. Berry
James D. Hall
Tomihiko Furuta

BY

ATTORNEY.

3,626,183

RADIOISOTOPE ANALYTICAL INSTRUMENT FOR CEMENT ANALYSIS OF CONCRETE

BACKGROUND OF THE INVENTION

The invention described herein was made in the course of, or under, a contract with the U.S. Atomic Energy Commission.

One of the most outstanding problems today in civil engineering is that of quality control of concrete. Criteria of quality are based on the strength of the concrete which presently can only be measured after setting and curing. It may then be too late and very expensive to rectify mistakes. The strength of concrete is related to the cement and water contents, the bulk density, and the degree of air entrainment of the wet mix. Ideally, onsite measurement of these parameters should be made within the short time available between delivery and pouring. Unsatisfactory concrete could then be rejected on the spot and costly mistakes avoided.

Nucleonic density and moisture gauges have been available for some time and their application to concrete analysis and other constructional materials is ever increasing. These instruments are capable of rapid nondestructive measurement and if properly employed give adequate accuracy of concrete bulk density and water content. Other nonnuclear methods are also available for measuring air entrainment and concrete consistency. No suitably rapid method has been developed, however, for onsite measurement of the cement content of the wet mix. Methods requiring physical separation of the cement and fine aggregate solids, followed by a determination of the cement to fines ratio from their respective densities, have so far not been successful in the field owing to the nonrepresentative nature of the separated sample. Chemical and other physical methods, though suitable in the laboratory, are not attractive for field analysis.

SUMMARY OF THE INVENTION

It is an object of this invention to provide a portable radioisotope instrument for cement analysis to within 1 percent cement in a measurement time of a few minutes.

Briefly, the instrument consists of a radiation permeable probe housing containing a pair of different energy radiation sources mounted in axial alignment with a detector. One source is axially positionable with respect to the other source to compensate for various type aggregates. The sources are shielded so that only backscattered radiation from the concrete matrix being examined reaches the detector. Counts from the detector are separated and stored corresponding to the respective $\gamma$-ray energies. The cement content is then determined from a calibration curve chosen for the particular type aggregate used in the concrete mix.

Other objects and many of the attendant advantages of the present invention will be evident from the following detailed description when taken in conjunction with the accompanying drawings.

TECHNICAL DISCLOSURE

Figure 1:
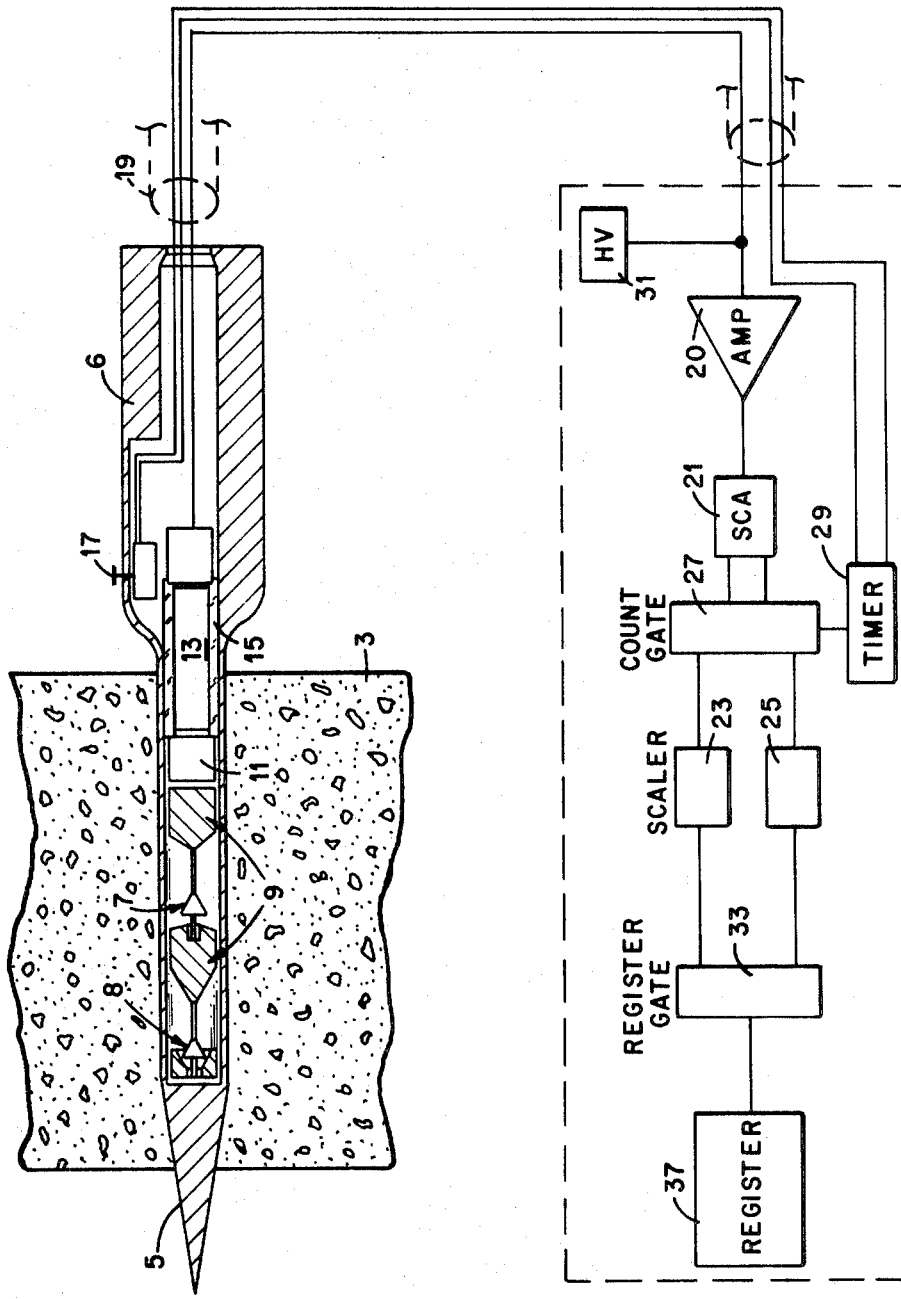
FIG. 1 is a schematic diagram of a portable concrete cement content analyzer according to the present invention.

REferring now to FIG. 1, the probe consists of a stainless steel walled tube 5 (1.25 in. O.D. × 0.020 in. wall thickness) pointed at one end for easy insertion into the sample and having a handle at the opposite end. Alternatively, the probe could be mounted in a section of the concrete pouring shute and the material flowed over it. In either case, a pair of conical-shaped radioisotope sources 7 and 8 are mounted within the tube 5 and are located on the probe axis at different spacing distances. Each source is shielded by shields 9 so as to direct radiation through the tube wall into the sample medium 6 and allow only backscattered radiation from the sample medium to strike a radiation detector 11, such as a (NaI) crystal scintillator positioned coaxially with the source 7 near the handle end of the tube 5.

It has been found that in a typical concrete matrix, analysis of cement content can be made independent of other matrix variables, such as aggregate type, bulk density and water content, by using a pair of gamma ray sources of different energy, preferably one of $Am^{241}$ (60 Kev) and the other of $Co^{57}$ (122 Kev). As an alternative to $Co^{57}$, a more energetic source such as $Cs^{137}$ (660 Kev) could be considered. The $Am^{241}$ source 7 is placed closer to the detector at a spacing of approximately 6 cm. therefrom while the $Co^{57}$ is placed at a distance of approximately 12 cm. and made adjustable in position along the axis by means of the mechanical arrangement shown in detail in FIG. 2.

Figure 2:
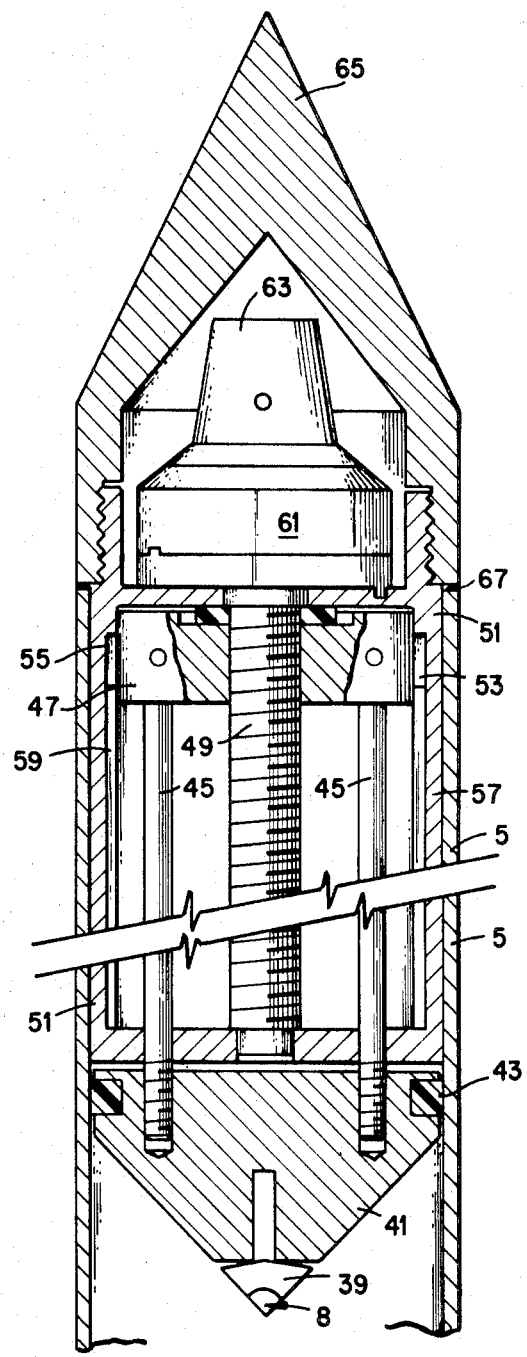
FIG. 2 is a cross-sectional view of the positioning apparatus for the movable source shown schematically in FIG. 1.

Referring to FIG. 2, there is shown a portion of the cylindrical housing 5 containing the positioning mechanism for positionable source 8, shown in the retracted position. The arrangement uses a jackscrew drive which provides longitudinal movement of the source holder without rotation; thus minimizing the effects of axial nonsymmetry in the radiation beam. The conical source is mounted on a source holder 39 which is held in place by shield 41, forming a portion of the shielding assembly 9 of FIG. 1. Shield 41 is slidably disposed within the housing 5 and centered by means of an annular guide ring 43 which slides along the inner wall of housing 5 as the source is positioned so that the source 8 remains axially aligned with source 7 (FIG. 1). The shield 41 is mounted on a pair of rods 45 which have their opposite ends mounted in a movable collar 47. Collar 47 is positioned by means of a jackscrew 49 threadably engaging the collar and rotatably mounted within a cylindrical frame member 51 which is coaxially mounted within housing 5. The collar is slidably mounted within frame member 51 by means of a pair of guides 53, 55 which move in guide slots 57 and 59, respectively, thereby moving the source by means of the rods 45 extending through the inner end of the frame member 51. The outer end plate of member 51 holds a sleeve 61 through which drive screw 49 is rotatably mounted and terminated in a multiturn position indicator knob 63, whereby the operator adjusts the source position by turning the knob 63.

The mechanism, including the position indicator, is sealed inside a removable nose cone 65 which is threadably mounted on the end of housing 5 by means of a outwardly extending annular threaded section of frame member 51. An annular gasket 67 is provided for waterproof sealing. The purpose of having one of the sources adjustable in position will be explained later.

Referring back to FIG. 1, the remainder of the probe consists of a conventional photomultiplier tube 13 positioned within the tube in alignment with the scintillator 11 so as to view the light emitted therefrom upon detection of radiation. Tube 13 is shock mounted in the tube by means of a styrofoam sheath 15. A switch 17 is mounted on the handle 6 so that the operator can actuate the counter unit connected to the handle end of the probe by means of an armored cable 19.

The counter unit consists of conventional single channel pulse height analyzer 21 fed from the output of an amplifier 20 connected to receive pulses from the probe photomultiplier tube 13 output. The analyzer divides the pulse into two groups, those with pulse heights between the discriminator levels (i.e., corresponding to the lower energy $Am^{241}$ radiation) and those with pulse heights above the higher discriminator level (i.e., corresponding to the higher energy $Co^{57}$ radiation). Each pulse group is then fed simultaneously into the corresponding scaler unit 23, 25, respectively, through a count gate 27. Each scaler unit consists of a prescaler (divide by 64) stage followed by a four-decade scaler. The counts are accumulated in each scaler until the timing sequence (probably 10 seconds) is complete. Counts from successive time intervals can be added to counts already stored. At the end of the measurement period (probably 50 seconds) the total counts accumulated in each scaler are then read off in turn on a register 37 by means of a selector switch (FIG. 3) which selectively actuates register gate 33 for separate registering of counts stored in the separate scalers as will be described in detail with reference to FIG. 3.

Figure 3:
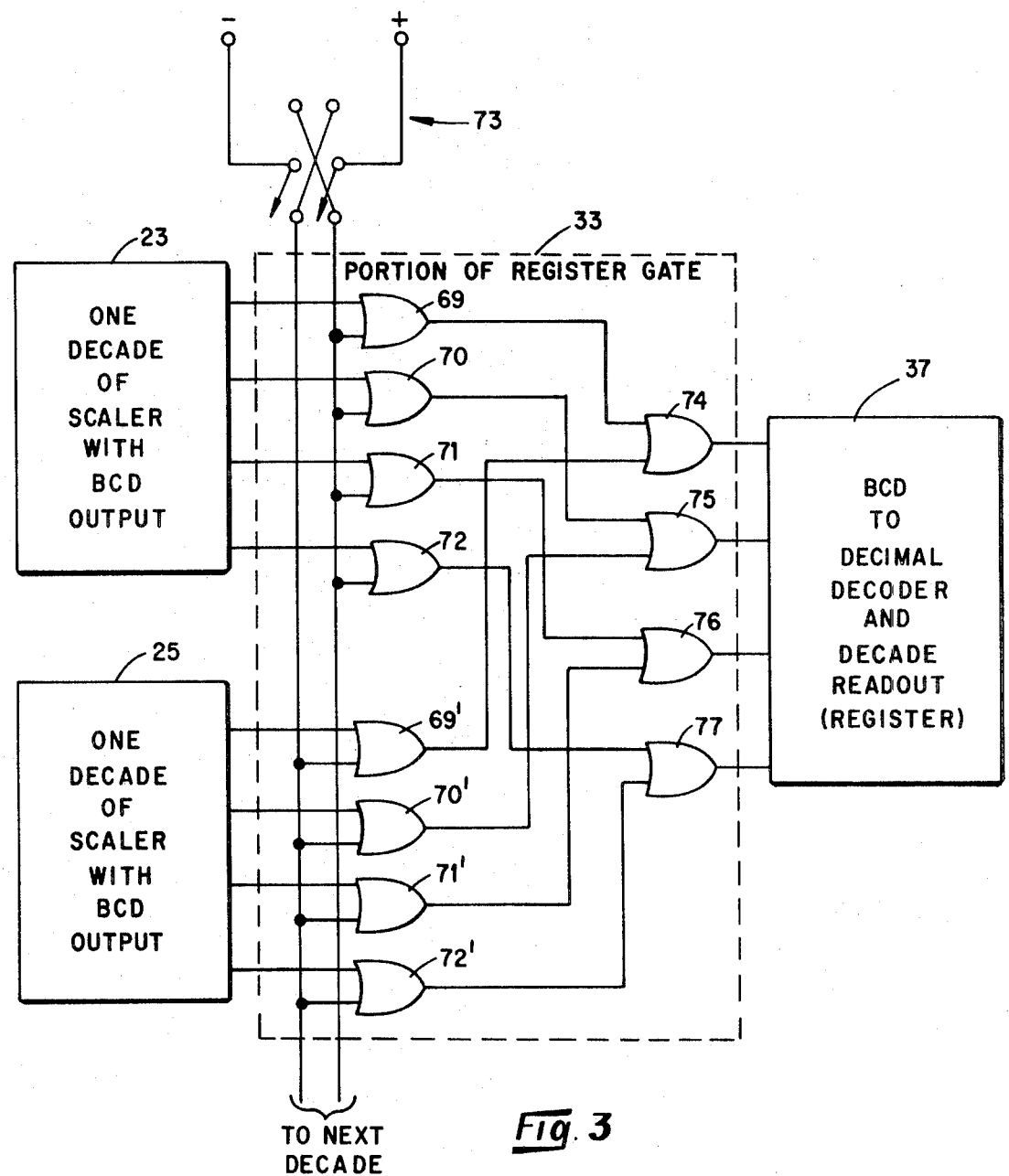
FIG. 3 is a schematic diagram of one decade of the register gating circuit shown in block diagram form in FIG. 1.

In FIG. 3 there is shown one decade for each scaler 23 and 25. As shown, each scaler decade has binary coded decimal (BCD) outputs connected to one input of respective AND-gates 69 through 72. The second input of each of the AND-gates 69 through 72 is connected to one terminal of a DPDT switch 73 while the second input of each of the AND-gates 69' through 72' is connected to another terminal of switch 73. Thus, by placing switch 73 in the proper position the binary coded information is passed by AND gates connected to one scaler while it is suppressed by the AND gates connected to the other scaler. The outputs of gates 69 through 72 are connected to corresponding inputs of OR-gates 74 through 77 so that the binary coded information is passed to the register which contains a conventional BCD to decimal decoder and decade readout. It will be understood that for four decades of display in register 37 four gating networks of this type are used. A new count is begun by resetting the scalers and subsequently starting the timer 29 (FIG. 1). The timer output is connected to gate 27 and is actuated by pressing the switch 17 on the handle of the probe unit which is connected to the timer 29. Power for the operation of the unit is supplied by a battery supply 31 mounted in the electronic unit.

It has been found that the analysis of cement content can be made with the above-described instrument independent of other matrix variables, such as aggregate type, bulk density and water content by the application of two radioisotope sources positioned at different distances along the axis from the same radiation detector. Measurement of the two radiation intensities, with reference to a calibration curve (see FIG. 4), yields the cement content. In order to correct for differences in aggregate type, all intensities are normalized to the intensity obtained in the dry aggregate and the appropriate calibration curve is selected.

Figure 4:
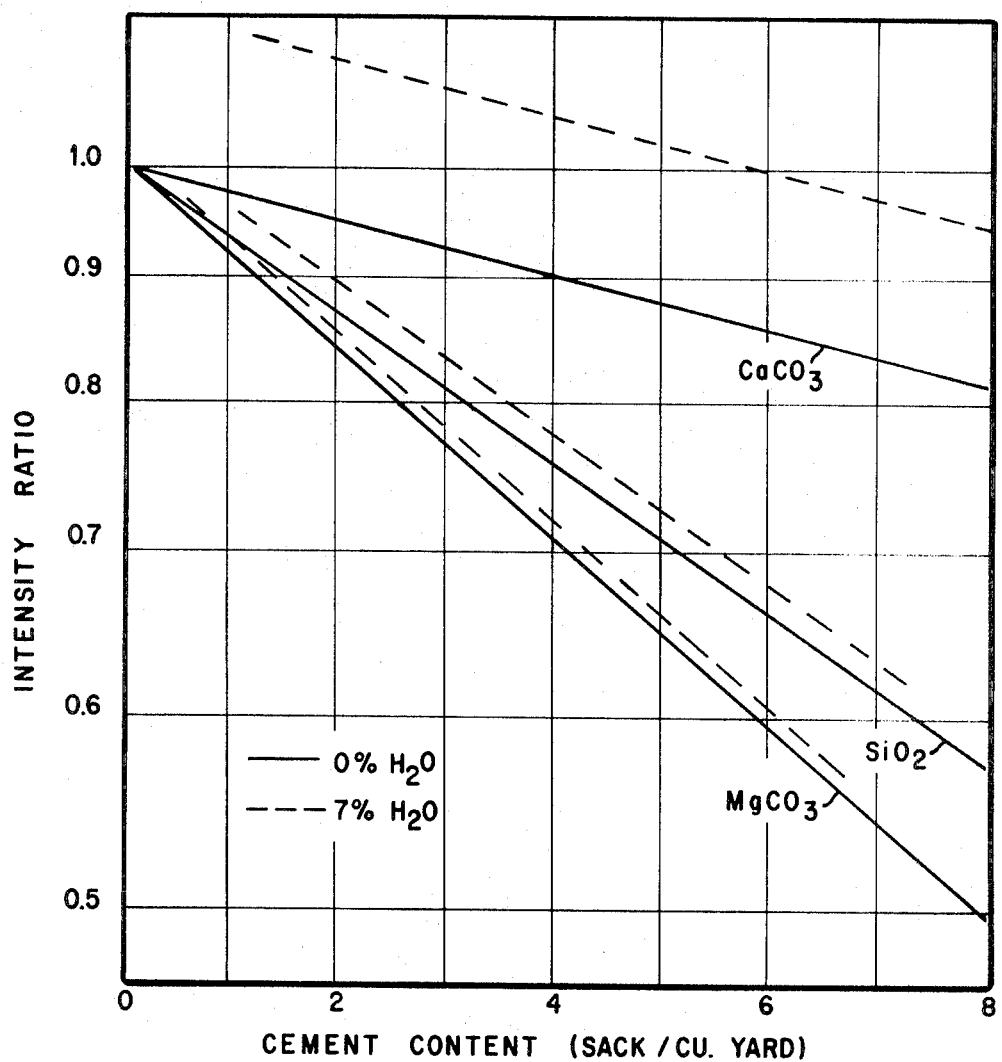
FIG. 4 is a set of calibration curves used with the instrument to determine cement content.

Referring now to FIG. 4, there is shown a family of calibration curves for concrete mixes of various aggregate materials, $MgCO_3$, $SiO_2$, and $CaCO_3$ at two water content values 0 and 7% $H_2O$. As shown, the ratio between the detected backscattered radiation intensities of the two sources is plotted against cement content in sacks/cu. yd., since this is the most commonly used measure for concrete mixes. By providing the ratio of the intensity measurements of the two sources $R_1$, $R_2$, it will be seen, as hereinafter described, that the measurement is relatively independent of the concrete bulk density and water content. It has been generally agreed in the art of detecting backscattered intensities from an isotopic primary beam that the intensity (I) is expressible by an equation of the form $$I = k \cdot \frac{\sigma}{\mu} \cdot (\mu\rho S)^n e^{-(\mu\rho S)} \quad (1)$$

where:

$S$ = the source to detector separation.
$\rho$ = bulk density of the sample surrounding the probe.
$\mu$ and $\sigma$ are related to the total absorption coefficient of the sample.
$k$ is a constant, and
$n$ is another constant for a particular source energy and gauge geometry, whose value lies between 0.6 and 1.6.

In practice, the value of $n$ and also the effective scattering and absorption coefficients must be determined experimentally. In the present instrument, the value of $n=1$ is used, and the absorption coefficients are calculated as follows:

$$\sigma = \sigma_a + (\sigma_c - \sigma_a) r_c + (\sigma_{H_2O} - \sigma_a) r_{H_2O} \text{ cm}^2/\text{gm}. \quad (2)$$

and $$\mu = \bar{\mu}_a + (\bar{\mu}_c - \bar{\mu}_a) r_c + (\bar{\mu}_{H_2O} - \bar{\mu}_a) r_{H_2O} \text{ cm}^2/\text{gm}. \quad (3)$$

In the equation above the suffixes $a$, $c$, and $H_2O$ refer to aggregate, cement, and water, respectively; $\gamma$ is the weight fraction, $\sigma$ is the total scatter cross section (Compton plus coherent), and $\mu$ is the average mass absorption coefficient for the incident and backscattered radiation.

In the case of two sources, as used herein, let the two source-detector distances from the detector be $S_1$ and $S_2$. Let also $\mu_1$ and $\mu_2$ = the effective absorption coefficient for the mix at the two radiation energies:

$_1\mu_a$ and $_2\mu_a$ = the coefficients for aggregates;
$_1\mu_c$ and $_2\mu_c$ = the coefficients for cement;
$_1\mu_{H_2O}$ and $_2\mu_{H_2O}$ = the coefficients for water;
and similarly for the $\sigma$'s.

From equation (1), the scattered intensity $(I_1)$ at energy 1, relative to dry aggregate is as follows:

$$\frac{I_1}{_1I_a} = \frac{\sigma_1}{_1\sigma_a} \cdot \frac{\rho e^{-(\mu_1\rho - _1\mu_a\rho_a)S_1}}{\rho_a} = R_1 \quad (4)$$

A similar expression $(R_2)$ defines the scattered intensity at energy 2. If the source detector spacing, $S_2$, is adjusted to satisfy the condition $$_2\mu_a \rho S_2 = _1\mu_a \rho S_1 \quad (5)$$

the ratio $R_1/R_2$ reduces to $$\frac{R_1}{R_2} = \frac{\sigma_1}{_1\sigma_a} \cdot \frac{2\sigma_a}{\sigma_2} \cdot exp - (\mu\rho S_1 - \mu\rho S_2) \quad (6)$$

Expanding the $\mu$'s in terms of the component values and simplifying according to equation (3) wherein $$\rho = 0.016 \rho' (\rho' \text{ in lb./cu. ft.})$$

$$r_c = \frac{3.48}{\rho'} V_c \; (V_c \text{ in sacks/cu. yd.})$$

and $\gamma_{H_2O}$ expressed in weight percent, the following is obtained for the exponent in equation (6).

$$[(_1\mu_c S_1 - _2\mu_c S_2) 3.48 \cdot V_c + (_1\mu_{H_2O} S_1 - _2\mu_{H_2O} S_2) \rho' r_{H_2O}] 0.016 \quad (7)$$

It will be seen in equation (7) that the measurement is relatively independent of bulk density and water content since the $\Delta\mu_{H_2O} \cdot S$ term is small compared to the $\Delta\mu_c \cdot S$ term when the condition expressed in equation (5) is met. Furthermore, a change in water content has an inverse effect on bulk density so that the function $R_1/R_2$ is even less sensitive to water content than equation (7) suggests. The $\sigma$ function which precedes the exponential in equation (6) is also relatively insensitive to bulk density and water content. Thus, a plot of the function $R_1/R_2$ is essentially a function only of cement content and constitutes a practical calibration curve. Thus, a calibration graph as shown in FIG. 4, can be calculated and normalized at zero cement content for various aggregates as shown. It is seen at a practical sensitivity to cement content is obtained even for a calcareous aggregate where the water content effect is greater than for the other aggregates on account of the relatively lower intensity contrast between aggregate and cement. In calcareous aggregates the water content must be determined to within an accuracy of ±5 percent or so for an accuracy of ±0.3 sacks/cu. yd. cement in measurements. It should be noted, however, that the water content effect is over-estimated in FIG. 4 since the compensating density change is not allowed for. In each of the curves in FIG. 4 a constant bulk density of 140 lbs./cu. ft. was assumed although the curves are relatively insensitive to this value. Tabulated narrow beam attenuation coefficients were used in the calculations and the appropriate source-detector separations were as follows:

|  | $S_1$(cm.) | $S_2$(cm.) |
| --- | --- | --- |
| $MgCO_3$ | 6 | 8.6 |
| $SiO_2$ | 6 | 10.0 |
| $CaCO_3$ | 6 | 14.1 |

As indicated in the table above the cobalt source must be mounted so that it can be varied in distance from the detector over the range shown for $S_2$ spacing in order to satisfy the conditions of equation (5).

In operation the device may be used as follows:

The removable nose cone 65 (FIG. 2) is removed from the probe housing and the movable source 8 is set in a reference position by means of position indicator knob 63, preselected for the most common type of aggregate. The probe is then inserted into a sample of the dry aggregate and the radiation intensities for both sources are measured. These recorded intensities will be indicative of the aggregate type. The operator then adjusts the source spacing appropriate for that aggregate. The two radiation intensities would then be recorded and the calibration curve (FIG. 4) corresponding to that source position is selected. The nose cone is replaced and the probe is then inserted into the concrete mix and the cement content determined from the normalized intensity ratio, off the chosen calibration curve.

Thus, it will be seen that in a typical concrete mix, analysis of cement content can be made independent of other matrix variables such as aggregate type, bulk density and water content. The technique requires two radioisotope sources positioned at different distances along the axis from the same radiation detector. Measurement of the two backscattered radiation intensities, with reference to a calibration curve, yields the cement content. In order to correct for differences in aggregate type, all intensities are normalized to the intensity obtained in the dry aggregate and the appropriate calibration curve is selected.

Obviously, numerous modifications may be made within the spirit and scope of the above disclosed teachings; therefore, the invention should be considered limited only by the following claims attached to and forming a part of this specification.

What is claimed is:

1. A radioisotope device for determining the quantity of cement in a concrete matrix, comprising:

a radiation permeable depth probe housing;

a first radioisotope source mounted within said housing on a longitudinal axis of said housing;

a second radioisotope source having a higher radiation emission energy than said first source disposed in said housing and spaced from said first source along said axis near one end of said probe housing;

means for positionably mounting said second source along said axis whereby the spacing between said first and second sources is varied;

a radiation detector means mounted in axial alignment with said first and second sources within said housing and having an electrical signal output;

radiation shielding means for shielding said detector from direct irradiation by said sources whereby said detector only receives backscattered radiation from said matrix being analyzed;

means having an input connected to the output of said detector means for counting events of said backscattered radiation from said matrix and separating events generated by said first source from the events generated by said second source; and means for storing and registering the counted events.

2. The device as set forth in claim 1 wherein said depth probe housing is a cylindrical-shaped housing having a removable conical-shaped end portion adjacent the position of said second source and a handle portion extending from the opposite end of said cylindrical housing.

3. The device as set forth in claim 2 wherein said radiation detector means is a scintillation-type detector including a photomultiplier tube having an output connected to the input of said counting means.

4. The device as set forth in claim 3 wherein said first and second radioisotope sources are conical-shaped gamma ray sources.

5. The device as set forth in claim 4 wherein said first radioisotope source is americium–241 and said second radioisotope source is cobalt–57.

6. The device as set forth in claim 5 wherein said first source is mounted at a distance of approximately 5 cm. along said axis from said scintillator and said second source is positionable within a range of from 8 to 15 cm. from said detector along said axis.

7. The device as set forth in claim 6 wherein said means for positionably mounting said second source includes a position indicating means sealably enclosed within said removable end portion of said probe housing.

8. The device as set forth in claim 7 wherein said means for counting said backscattered radiation events includes an amplifier having an input and an output, said input being connected to the output of said photomultiplier tube, and a single channel pulse height analyzer having an input and a first output corresponding to events generated by said second radioisotope source and a second output corresponding to events generated by said first radioisotope source.

9. The device as set forth in claim 8 wherein said means for storing said counted events includes first and second scalers connected to receive said first and second outputs of said pulse height analyzer, respectively, a first gating means coupling said first and second outputs of said analyzer to said first and second scalers, respectively, a timer connected to said gating means for controlling the passage of counted events to said scalers, a count register, and a second gating means for selectively passing the counts stored in said scalers to said register.

10. The device as set forth in claim 9 further including means for correlating the registered counts with the quantity of cement in the concrete matrix being analyzed.

* * * * *